US012045994B2

(12) United States Patent
Nakamura et al.

(10) Patent No.: US 12,045,994 B2
(45) Date of Patent: Jul. 23, 2024

(54) MOTION RECOGNITION METHOD AND DEVICE

(71) Applicant: THE UNIVERSITY OF TOKYO, Tokyo (JP)

(72) Inventors: Yoshihiko Nakamura, Tokyo (JP); Wataru Takano, Tokyo (JP); Yosuke Ikegami, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 23 days.

(21) Appl. No.: 17/273,148

(22) PCT Filed: Aug. 28, 2019

(86) PCT No.: PCT/JP2019/033662
§ 371 (c)(1),
(2) Date: Mar. 3, 2021

(87) PCT Pub. No.: WO2020/050111
PCT Pub. Date: Mar. 12, 2020

(65) Prior Publication Data
US 2024/0020853 A1  Jan. 18, 2024

(30) Foreign Application Priority Data

Sep. 3, 2018 (JP) ................. 2018-164554

(51) Int. Cl.
G06T 7/215 (2017.01)
G06T 7/143 (2017.01)
(52) U.S. Cl.
CPC .............. G06T 7/215 (2017.01); G06T 7/143 (2017.01); G06T 2207/10016 (2013.01); G06T 2207/10024 (2013.01)

(58) Field of Classification Search
CPC .................... G06T 7/215; G06T 7/143; G06T 2207/10016; G06T 2207/10024
See application file for complete search history.

(56) References Cited

U.S. PATENT DOCUMENTS

2019/0087965 A1* 3/2019 Datta ................. G06T 7/251
2019/0220657 A1* 7/2019 Yabuki ................ G06V 20/49

FOREIGN PATENT DOCUMENTS

CN   107945207 A * 4/2018
JP   2010213782 A * 9/2010
(Continued)

OTHER PUBLICATIONS

J. Shin and S. Ozawa, "A study on motion analysis of an artistic gymnastics by using dynamic image processing—for a development of automatic scoring system of horizontal bar—," 2008 IEEE International Conference on Systems, Man and Cybernetics, Singapore, 2008, pp. 1037-1042 (Year: 2008).*

(Continued)

Primary Examiner — Vu Le
Assistant Examiner — Jack Peter Kraynak
(74) Attorney, Agent, or Firm — Ladas & Parry, LLP

(57) ABSTRACT

The invention relates to automatic discovery and evaluation of a motion by treating motion recognition as an optimization problem by considering a series of basic motions obtained by segmenting a subject motion. The method comprises segmenting time series data defining a motion of a subject into a plurality of segments, classifying each segment into a class for a basic motion by using time series data of the segment, and converting the motion of the subject to a sequence of high rank symbols in which each high rank symbol is formed from a series of the basic motions, wherein a function that calculates a score based on a set of a high rank symbol and a sequence of basic motions is provided and the motion of the subject is converted to the sequence of (Continued)

the high rank symbols by an optimization calculation using dynamic programming.

13 Claims, 7 Drawing Sheets

(56) References Cited

FOREIGN PATENT DOCUMENTS

| JP | 2010213782 A | 9/2010 | | |
|---|---|---|---|---|
| WO | 2007138885 A1 | 12/2007 | | |
| WO | WO-2007138885 A1 * | 12/2007 | ............. | G06F 16/51 |
| WO | 2018070414 A1 | 4/2018 | | |

OTHER PUBLICATIONS

Wataru Takano, Yoshihiko Nakamura, Real-time Unsupervised Segmentation of human whole-body motion and its application to humanoid robot acquisition of motion symbols, Robotics and Autonomous Systems, vol. 75, Part B, 2016, pp. 260-272, ISSN 0921-8890 (Year: 2016).*

Wataru Takano, Hirotaka Imagawa, Yoshihiko Nakamura, Spatio-temporal structure of human motion primitives and its application to motion prediction, Robotics and Autonomous Systems, vol. 75, Part B, 2016, pp. 288-296, ISSN 0921-8890 (Year: 2016).*

International Search Report in the international application No. PCT/JP2019/033662, mailed on Nov. 5, 2019.

Written Opinion of the International Searching Authority in the international application No. PCT/JP2019/033662, mailed on Oct. 25, 2019, and English translation provided by Google Translate.

Takano et al., "Real-time Unsupervised Segmentation of human whole-body motion and its application to humanoid acquisition of motion symbols", Robotics and Autonomous Systems, 2015, Elsevier B.V., p. 260-272.

Takano et al., "Spatio-temporal structure of human motion primitives and its application to motion prediction", Robotics and Autonomous Systems, 2015, Elsevier B.V., p. 288-296.

Shin et al., "A Study on Motion Analysis of an Artistic Gymnastics by using Dynamic Image Processing for a Development of Automatic Scoring System of Horizontal Bar", IEEE International Conference on Systems, Man and Cybernetics, 2008, p. 1037-1042.

* cited by examiner

MOTION RECOGNITION METHOD AND DEVICE

CROSS-REFERENCE TO RELATED APPLICATIONS

The present application is the U.S. national phase of PCT Application No. PCT/JP2019/033662 filed on Aug. 28, 2019, which claims a priority to the Japanese patent application No. 2018-164554 filed on Sep. 3, 2018, the disclosures of which are incorporated herein by reference in their entireties.

TECHNICAL FIELD

The present invention relates to motion recognition method and device.

BACKGROUND OF THE INVENTION

There have been studies that attempt to segment and recognize human motions (Non-Patent Documents 1 and 2). Algorithms in robotics represented by kinematics and dynamics calculations have been developed into segmentation, identification, and prediction techniques for human whole-body motions using the statistical technique. The applications of these calculation technologies are wide-ranging, such as sports training and rehabilitation.

As for motion recognition in sports, the use of automatic scoring technology by machine for a competition that requires scoring by referees becomes an issue considering backgrounds such as the improvement of human motion sensing technology, the development of machine learning technology for artificial intelligence, the complexity and sophistication of motion and skills in sports, and the accompanying limits of human judgment. Physical motion measurements and advanced information processing technologies are considered to provide one solution to such a problem (Non-Patent Document 3).

Patent Document 1 discloses a motion recognition device that evaluates a performance of a subject, and the motion recognition device includes a segmentation unit, an identification unit, and an evaluation unit. The device evaluates skills and a difficulty level of the performance by segmenting the performance data of the subject.

CITATION LIST

Patent Document

[1] WO2018/070414

Non-Patent Document

[1] Wataru Takano, Yoshihiko Nakamura, "Real-time Unsupervised Segmentation of human whole-body motion and its application to humanoid robot acquisition of motion symbols," Robotics and Autonomous Systems, Vol. 75, Part B, pp. 262-272, 2016.
[2] Wataru Takano, Hirotaka Imagawa, Yoshihiko Nakamura, "Spatio-temporal structure of human motion primitives and its application to motion prediction," Robotics and Autonomous Systems, Vol. 75, Part B, pp. 2288-2296, 2016.
[3] J. Shin and S. Ozawa. A study on motion analysis of an artistic gymnastics by using dynamic image processing—for a development of automatic scoring system of horizontal bar -. In Proceedings of IEEE International Conference on Systems, Man and Cybernetics, pages 1037-1042, 2008.

SUMMARY OF THE INVENTION

An object of the present invention is to automatically discover and evaluate a motion by treating motion recognition as an optimization problem by considering a series of basic motions obtained by segmenting a motion of a subject.

The present invention relates to technology for identifying and explaining a human motion, and comprises a calculation for segmenting a human motion, a calculation for identifying each cut out segment by comparing with a basic motion, and a calculation that discovers a motion consisting of a series of basic motions and evaluates and determines whether the motion is an appropriate explanation on the context. The present invention solves a problem of finding a motion, a technique in an athletic competition such as gymnastics, from a series of basic motions as a solution to an optimization problem by applying dynamic programming. The present invention can also be applied to a system that automatically interprets general human motions and an automatic scoring system that recognizes and scores motion techniques such as gymnastics and figure skating.

A motion recognition method according to the present invention comprises: segmenting time series data defining a motion of a subject into a plurality of segments; classifying each segment into a class for a basic motion by using time series data of the segment; and converting the motion of the subject to a sequence of high rank symbols in which each high rank symbol is formed from a series of the basic motions, wherein a function that calculates a score based on a set of a high rank symbol and a sequence of basic motions is provided and the motion of the subject is converted to the sequence of the high rank symbols by an optimization calculation using dynamic programming.

A motion recognition system according to the present invention comprises a memory and a processer,
 the memory configured to store classes for a plurality of basic motions; and
 the processor configured to:
  segment time series data defining a motion of a subject into a plurality of segments,
  classify each segment into a class for a basic motion by using time series data of the segment, and
  convert the motion of the subject to a sequence of high rank symbols in which each high rank symbol is formed from a series of the basic motions, wherein
  the memory is configured to define a function that calculates a score based on a set of a high rank symbol and a sequence of basic motions, and
  the processor is configured to convert the motion of the subject to the sequence of the high rank symbols by an optimization calculation using dynamic programming and the score.

The present invention is also provided as a computer program that causes the computer to function as a storage unit and a processing unit of the above-mentioned system, or as a computer-readable medium that stores the computer program.

The optimization calculation using the dynamic programming comprises using the following recursive relation:

$$f_k(\lambda_l, \lambda_{l+1}, \ldots, \lambda_N) = \max_{l \leq m < N} [g(\lambda_l, \lambda_{l+1}, \ldots, \lambda_m) + f_{k-1}(\lambda_{m+1}, \lambda_{m+2}, \ldots, \lambda_N)]$$

where:

$f_k(\lambda_l, \lambda_{l+1}, \ldots, \lambda_N)$ refers to a maximum score obtained when k pieces of the high rank symbols are extracted from a series of the basic motions $\lambda_l, \lambda_{l+1}, \ldots, \lambda_N$;

$g(\lambda_l, \lambda_{l+1}, \ldots, \lambda_m)$ refers to a score obtained when a sequence of basic motions $\lambda_l, \lambda_{l+1}, \ldots, \lambda_m$ is identified as a high rank symbol; and N refers to the number of segments obtained by segmenting the motion of the subject.

It should be noted that even if a formula is formally different from the above recursive relation, such formula considered to be equivalent by those skilled in the art is included in the scope of the present invention.

In one aspect, a table is provided in which one or more sequences of the basic motions and scores corresponding to a high rank symbol are provided. In one aspect, a function that calculates the score for a combination of a high rank symbol and a sequence of basic motions as a probability value (likelihood) has been learned. As this function, a statistical model, a neural network, or the like that outputs the likelihood in response to inputs of a high rank symbol and a sequence of basic motions can be used. Parameters of the above function are stored in the storage unit 104 of the motion recognition system 100, and the processing unit 102 calculates the score for the combination of the high rank symbol and the basic motion sequence using the parameters.

In one embodiment, the segment is classified into a class of basic motion using a Hidden Markov model (HMM).

In one aspect, the high rank symbol comprises a technique in athletics. By setting the score corresponding to each technique to match the actual scoring, it is possible to identify techniques from the motion of the subject and output a score regarding a difficulty level of technique (for example, D score in gymnastics competition) that can be used for an automatic scoring at the same time.

In one embodiment, the motion of the subject may be converted to a sequence of higher rank symbols which represents a superordinate motion by using an obtained high rank symbol as a segment.

The present invention recognizes a motion of a subject by converting the motion data of the subject into a sequence of high rank symbols.

In the embodiment, a technique in gymnastics is identified by noting that the technique is a series of basic motions which is extracted so that a score is increased.

DESCRIPTION OF THE EMBODIMENT

[A] Outline of Motion Recognition System According to Embodiment

Figure 1:
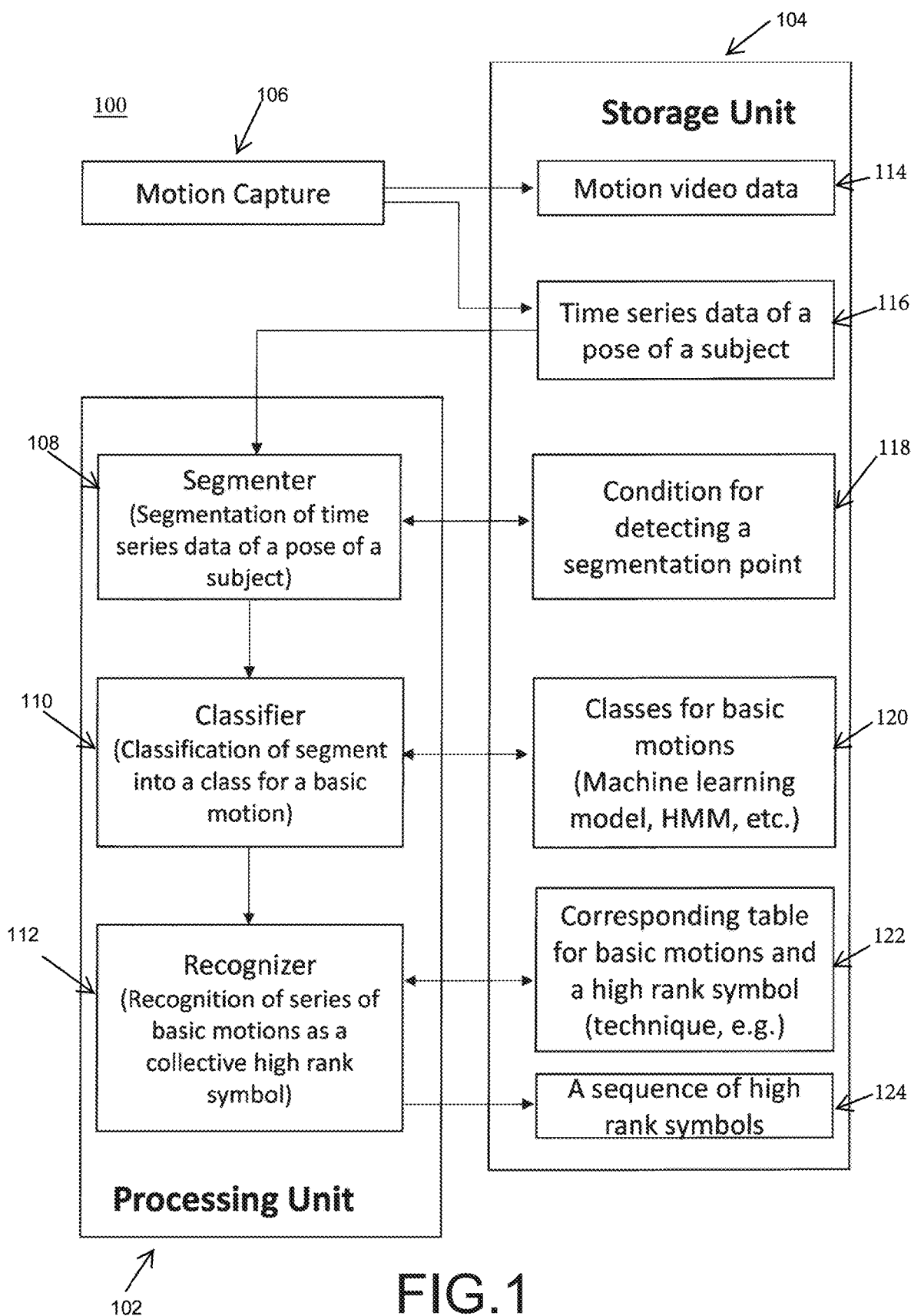
FIG. 1 is an overall view of a motion recognition system.
Figure 2:
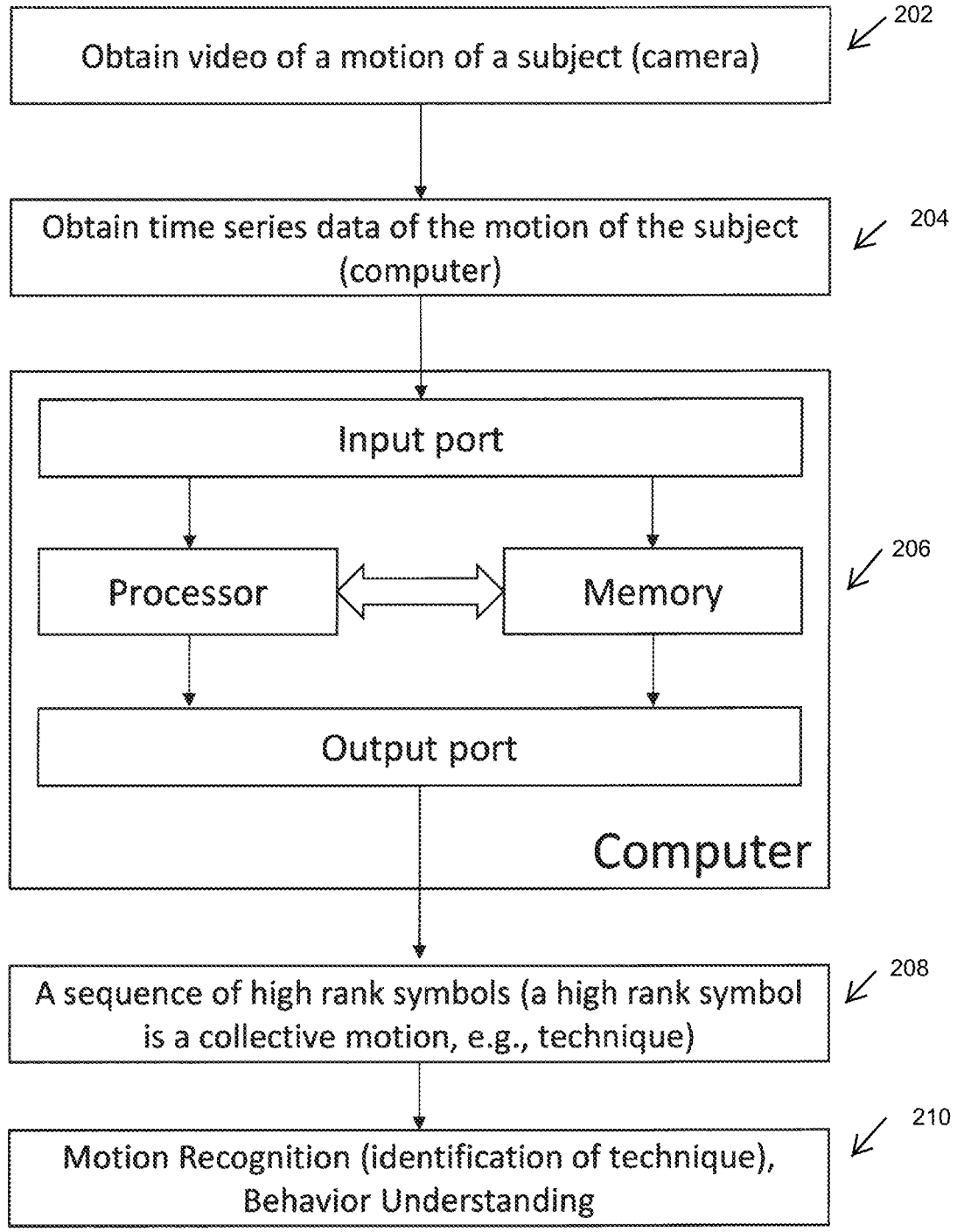
FIG. 2 is a schematic diagram showing a hardware configuration of a motion recognition system.

As shown in FIG. 1, a motion recognition system 100 according to the present embodiment comprises a processing unit 102 and a storage unit 104 and interprets a motion of a subject based on the motion data of the subject obtained by motion capture 106. The motion recognition system 100 is comprised of one or a plurality of computers. As shown in FIG. 2, in one aspect, the motion capture 106 is comprised of a camera which acquires video data of a motion of a subject 202 and one or a plurality of computers 206 which acquire time-series data representing the motion of the subject based on the video data 204. A computer 206 includes an input unit, a processing unit, a storage unit (RAM and ROM), and an output unit. In one embodiment, the output unit may comprise a display.

The motion of the subject is defined by the time series data of the pose of the subject which is obtained by the motion capture 106. The pose of the subject is defined by a plurality of feature points (typically joints) in the body of the subject, and the motion of the subject is defined by time series data of 3D coordinate values of a plurality of feature points by obtaining the 3D coordinate values of the plurality of feature points in each frame. The type of motion capture 106 used in this embodiment is not limited, and an optical motion capture using an optical marker that specifies a feature point, a technique in which motion data of a subject is obtained by attaching inertial sensors such as an acceleration sensor, a gyroscope, or a geomagnetic sensor to the subject body, markerless motion capture without attaching the optical marker and the sensor to the body, and the like can be exemplified. The Markerless motion capture is advantageous from the point of not interfering with the natural movement of the subject. As for the markerless motion capture, motion capture 106 using a system provided with a camera and a depth sensor (Kinect, for typical example) or a motion capture 106 in which motion data is obtained by analyzing RGB image(s) from one or more viewpoints by deep learning can be exemplified.

The processing unit 102 of the motion recognition system 100 comprises a segmentation unit or segmenter (collectively referred to "segmentation unit" hereafter) 108 for segmenting input time series data of a pose of a subject to a plurality of segments, a classification unit or classifier (collectively referred to "classification unit" hereafter) 110 for classifying the segment into a class for a basic motion by using time series data of the segment, and a motion recognition unit or recognizer (collectively referred to "recognition unit" hereafter) 112 for converting the motion of the subject to a sequence of high rank symbols 208 each of which is a series of basic motions by an optimization calculation using dynamic programming 604 to perform motion recognition and/or behavior understanding 210, 310.

A segment is segmented motion data obtained by segmenting time series data that defines the motion of the subject and is comprised of time series data of a plurality of frames. A series of all segments is time series data that defines the motion of the subject. A segment is cut out from the motion data such that the segment corresponds to one of the basic motions. Each of the segment obtained by segmenting the motion of the subject is classified into one of the classes of the basic motions and is identified as one of the basic motions. A sequence of segments obtained by segmenting the motion of the subject is converted to a sequence of basic motion by classifying all the segments into one of the classes.

The basic motion is time-series data of a plurality of frames, and is a motion unit or an element, a time series of which constitutes the motion of the subject. Considering that a series of a plurality of basic motions (or, a sequence of base motions) is recognized as a certain collective motion, the collective motion is called a high rank symbol. The high rank symbol is typically a known series of basic motions. What kind of motions are treated as a basic motion and a high rank symbol may differ depending on the motion of the subject, the purpose of motion recognition, the segmentation method, and the like. For example, when identifying a technique from a motion of a subject, a technique is a high rank symbol, and the technique is comprised of a sequence of basic motions or elements.

As for a high rank symbol consisting of a series of a plurality of basic motions, other than the technique, a high rank symbol consisting of a series of a plurality of basic motions includes, for example, a high rank symbol "cooking" for a sequence of basic motions such as "cutting", "stir-frying", and "presenting", a high rank symbol "cleaning" for a sequence of basic motions such as "putting away", "sweeping", and "wiping", and a high rank symbol "assembling (on the factory line, etc.)" for a sequence of basic motions such as "fitting part A", "turning a screw", and "mounting part B" can be used for linguistic abstractions.

The storage unit 104 of the motion recognition system 100 stores time-series data of a pose of a subject 116, segmentation point conditions 118, classes for basic motions with a learned model 120, and a table for storing a sequence of basic motions—and a score corresponding to a high rank symbol 122. In one embodiment, the class of basic motion is characterized by a Hidden Markov Model (hereinafter referred to as "HMM"). Further, it is sufficient that a function for calculating a score from the set of the high rank symbol and the sequence of basic motions is provided. In replace of or in addition to the table, a function that calculates a score for a combination of a high rank symbol and a sequence of basic motions as a probability value (likelihood) has been learned and parameters for the function may be stored in the storage unit. Further, the sequence of high rank symbols 124 obtained by the motion recognition unit is stored together with the corresponding sequence of basic motions. In the storage unit, video data capturing the motion of the subject 114 may be stored.

Figure 3:
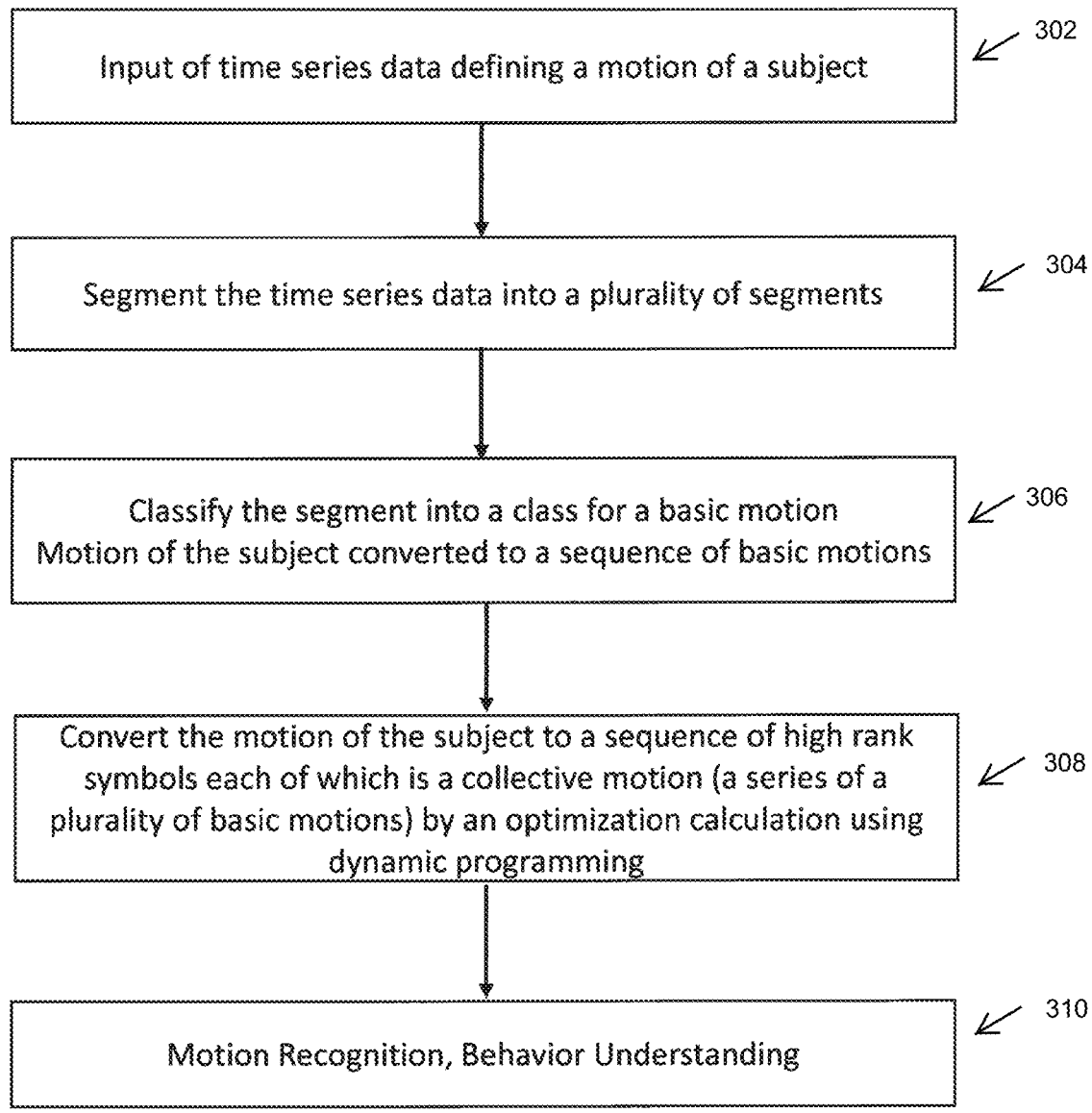
FIG. 3 is a flowchart showing a motion recognition process.

As shown in FIG. 3, the motion recognition method according to the present embodiment comprising receiving time series data that defines the motion of the subject 302, segmenting the received time series data into a plurality of segments 304, converting the motion of the subject to a sequence of basic motions by classifying the segment into a class for a basic motion 306, and converting the motion of the subject to a series of high rank symbols each of which is formed from a series of basic motions by an optimization calculation using dynamic programming 308. Motion recognition or behavior understanding 210, 310 is performed based on a converted sequence of high rank symbols.

[B] Segmentation of Motion of Subject

The motion of the subject is segmented into a plurality of segments. Each segment is time series data of a plurality of frames that defines the pose of the subject. In one aspect, the specific pose of the subject and the positional relationship between the subject and an environment are predetermined as segmentation conditions and if a pose of the subject and the positional relationship between the subject and the environment in a frame at time t satisfies the segmentation conditions, the frame at time t is determined as a segmentation point. In this case, the frame at time t becomes the first frame of the new segment, for example.

Figure 7:
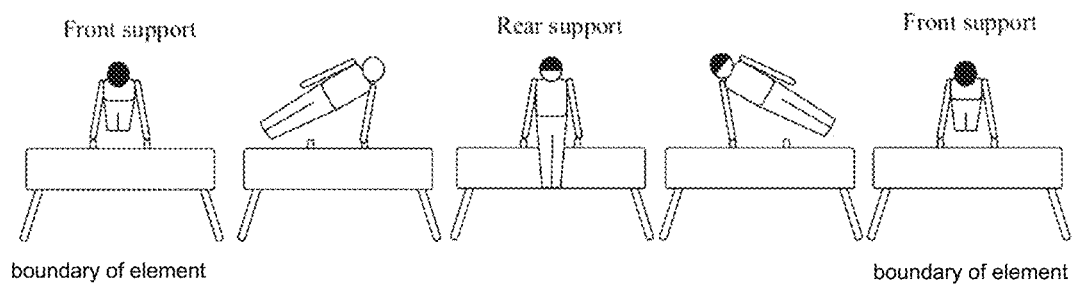
FIG. 7 is a figure explaining the condition of a segmentation point in the motion on the pommel horse.

For example, taking the pommel horse as an example, regarding the segmentation points in the motion on the pommel horse, it is possible to set the following conditions based on clues obtained by asking referees how to find the segmentation point (referring to FIG. 7). If a point meets satisfies the following three conditions:

(a) both hands contact the pommel horse;
(b) an upper body directs downward (the z-axis component of the body vector is negative); and
(c) an upper body is parallel or perpendicular to the longitudinal direction of the pommel horse, such point is detected as a segmentation point of the motion. For details of the segmentation points in the motion on the pommel horse, Patent Document 1 can be referred to. The segmentation point is determined by detecting a frame including a pose which satisfies the above conditions based on the time series data of the pose of the subject performing on pommel horse, the contact condition with the predetermined portion of the pommel horse, and the orientation with respect to the pommel horse. By so doing, the motion of the subject performing on the pommel horse is segmented into a plurality of segments.

In gymnastics competitions other than the pommel horse and other scoring competitions, it is possible to set segmentation points by referring to an interview with the referees and the rulebook. Regarding other gymnastics competitions such as the horizontal bar and parallel bars, and regarding other scoring competitions such as figure skating, a motion of a subject can be segmented by setting segmentation points.

As mentioned above, in the case of pommel horse, the condition of the segmentation point is manually set, but when extending the technique identification as motion recognition to general behavior understanding, a machine learning method (supervised learning) can be adopted in which the segmentation point is set by giving a segmentation point to an action by human (teacher) in the same way as the pommel horse case and the relationship between the motion and the segmentation point has been learned. Alternatively, a method of performing unsupervised learning that automatically extracts a motion pattern from motion data, a method of detecting stop motion in which a velocity of a part of the body becomes zero, a method of detecting a point where the distribution of motion changes significantly, and a method of detecting a point at which it becomes difficult to predict a motion can be adopted.

It is understood by those skilled in the art that in segmenting the motion of a subject, in addition to the pose data of the subject itself, additional information such as contact conditions with an environment or an object and positional relationship with an environment or an object, etc. can be used. Most of human motions interact with an environment and an object. For example, in the case of cooking, in addition to the motion of the subject, a contact state between the subject and a foodstuff, a cooking utensil, etc., and a position and orientation of the subject with respect to the foodstuff, the cooking utensil, etc. can be important information. In the case of cleaning operation, in addition to the motion of the subject, a contact state between the subject and a cleaning tool, a position and orientation of the subject with respect to the cleaning tool, a position and orientation of the subject with respect to the environment, and a contact state between the cleaning tool and the environment, etc. can be important information. In the case of a motion during assembly work, in addition to the motion of the subject, a contact state between the subject and a tool or part, a position and orientation of the subject with respect to an assembly, and a contact state between the part and the assembly, etc. can be important information. In human motion, it is possible to segment the motion not only by the motion itself but also by finding a boundary of the segments of the motion based on relationships among the motion, an environment, and an object.

[C] Classification/Recognition of Segment

The storage unit 104 of the motion recognition system provides classes or categories in which various basic motions are classified. In one aspect, each class is characterized by a learned model (for example, an HMM). The processing unit 102 of the motion recognition system 100 comprises a classifier 110 using the learned model (for example, an HMM), and the classifier 110 uses segment information (time series data) and the learned model (for example, an HMM) to determines which class the input segment belongs to.

In the present embodiment, the segments obtained by segmenting the motion data are subject to clustering, and the motion data included in each cluster has been learned by using an HMM. The HMM represents a class of a basic motion 506. In recognition, a segment that is segmented motion data is classified as an HMM having the maximum probability that the motion data is generated.

In learning the basic motions 506, a supervised classification is adopted for classifying a large number of segments. Specifically, for example, in gymnastics, labels based on the judgment by referees and experts are assigned to each segment (time-series data of pose) 502 and used as training data 504. By including the data of the scoring examples by the referees in the training data, it is possible to introduce the information regarding the subjective aesthetic evaluation. This makes it possible to deal with the viewpoint of experts and a sensitivity evaluation by the experts, and it is possible to make the judgment of competition data closer to the judgment by an actual referee. In scoring competitions such as gymnastics, by detecting the segmentation points in the motion by focusing on a key frame that the referee pays attention to, the obtained segment is the motion that matches the intuition, and the basic motion label may be easily assigned. The motion data (segment) is subject to clustering using the basic motion label as training data, and a statistical model has been learned for each basic motion. By using this statistical model to identify the motion (segment), the motion (segment) can be identified as a basic motion label associated with the statistical model. That is, only the segmentation data with the same basic motion label is made into a cluster, and the statistical model has been learned for each cluster to obtain the basic motion. In the present embodiment, the acquisition of the basic motion is performed by calculating a Hidden Markov Model (HMM) that has learned each classified cluster as training data so as to maximize the generation probability.

Learning of basic motions will be described more specifically. Motion data is obtained from multiple performances of multiple subjects. A large number of segments (segmented motion data) obtained by segmentation are used as basic motion data for training (or, training data). A plurality of labels for basic motions are prepared and each one of basic motion labels are manually assigned to the training data. A large number of training data are hierarchically classified into tree-structured clusters using the Dynamic time warping (DTW) method, and a cluster consisting of segments with the same label is searched for and the cluster is regarded as a cluster representing each label. The segments included in each cluster are encoded in HMM, and each cluster is treated as a class of a basic motion. By optimizing the parameters of the HMM using the Baum-Welch algorithm, an HMM that maximizes the probability of generating training data is formed. A classifier for time-series data by HMM is known to those skilled in the art, and when recognizing a motion of a subject, each segment obtained by segmenting the motion data of the subject is classified and recognized as an HMM that has the maximum probability that the motion data defining each segment is generated.

In dealing with the physical motion data, scaling may be performed according to the physical difference, and the scaled variable may be used. A velocity of motion may also be scaled to absorb individual differences. Specifically, scaling is performed in the process of forming the HMM classifier and the process of determining which basic motion class the observed data (segment) belongs to. A ratio of the height of the standard body to the height of the subject is calculated, and the motion data of the subject is enlarged or reduced according to the ratio. Frame interpolation processing may be performed so that the segment expands and contracts in the temporal direction so as to obtain a segment having a fixed length. Scaling can correct the difference in the athlete's body size and the resulting motion velocity.

The method of classifying/recognizing a segment of motion data (time-series data of pose) is not limited to the classification method using the HMM with segmented data, and other classification/recognition method (typically a supervised method using training data) known to those skilled in the art can be used, for example, a neural network may be used to classify the segments.

[D] Recognition of High Rank Symbol Consisting of a Series of Basic Motions

The motion recognition unit discovers a motion (a high rank symbol) formed from a series of basic motions 602 and evaluates and determine whether the high rank symbol is an appropriate explanation based on the context. The motion recognition unit calculates a problem of finding a high rank symbol, a technique in an athletic competition such as gymnastics, from a series of basic motions 602 as a solution to an optimization problem by applying dynamic programming 604.

Motion recognition will be described by taking an identification of technique in competition as an example. Motion data of a subject is segmented into a plurality of segments, and by classifying each segment into a basic motion class using an HMM, the motion data of the subject is converted to a time series of basic motions $(\lambda_1, \lambda_2 \ldots, \lambda_N)$. A technique is a series of a plurality of basic motions, and a sequence of basic motions suitable for being recognized as a technique is extracted.

The following recursive relation $$f_k(\lambda_l, \lambda_{l+1}, \ldots, \lambda_N) = \max_{l<m<N}[g(\lambda_l, \lambda_{l+1}, \ldots, \lambda_m) + f_{k-1}(\lambda_{m+1}, \lambda_{m+2}, \ldots, \lambda_N)]$$

can be derived where $f_k(\lambda_l, \lambda_{l+1}, \ldots, \lambda_N)$ refers to a maximum score obtained when extracting k pieces of techniques from a sequence of basic motions $\lambda_l, \lambda_{l+1}, \ldots, \lambda_N$ Here, $g(\lambda_l, \lambda_{l+1}, \ldots, \lambda_m)$ refers to a score obtained when a sequence of basic motions $\lambda_l, \lambda_{l+1}, \ldots, \lambda_m$ is identified as one technique.

The storage unit 104 of the motion recognition system 100 stores a table that defines the correspondence between the basic motion sequence and the technique and score. Specifically, a technique label is manually assigned to a series of basic motions, and the series of basic motions is defined by a sequence of HMMs each of which characterizes each basic motion. The sequence of basic motions (a sequence of HMMs) is stored as a database with respect to a technique ID and a technique label.

In one aspect, if the sequence of basic motions $\lambda_l, \lambda_{l+1}, \ldots, \lambda_m$ is in the database, then the score of $g(\lambda_l, \lambda_{l+1}, \ldots, \lambda_m)$ is 1, otherwise it is 0. Then, when the sequence of basic motion is in the database, the motion is identified as a technique corresponding to the sequence of basic motions. That is, a score of 1 is assigned to each sequence of basic motions (a sequence of HMMs), and if a sequence of basic motions is in the database, the score of the evaluation function g is 1, otherwise it is 0. While discovering collectiveness of the sequence of the basic motions so that the evaluation function f using the recursive relation is maximized, the basic motion sequence is identified as a technique corresponding to the collectiveness.

The case in which a table defining the correspondence between the basic motion sequence and the technique and score is used has been described, but it is sufficient that a function for calculating the score from the set of a high rank symbol and the basic motion sequence is provided. For example, a function that calculates a score for a combination of a high rank symbol and a sequence of basic motions as a probability value (likelihood) has been learned and parameters for the function may be stored in the storage unit. Then, the processing unit 102 may calculate the score for the combination of the high rank symbol and the sequence of basic motions by using the parameters. As for this function, a statistical model, a neural network, and the like that outputs the likelihood in response to inputs of a high rank symbol and a sequence of basic motions can be used.

The above recursive relation calculates how far it is optimal to identify a series of consecutive basic motions from the basic motion $\lambda_l$ as one technique, and this recursive relation is solved by using dynamic programming to obtain an optimal collective sequence of basic motions and a high rank symbol (technique in the above example) corresponding to the collective sequence. In order to explain human motions, the motion recognition unit discovers a high rank symbol (typically a known sequence of basic motions) from the sequence of basic motions recognized after segmentation and identifies the motions. At this time, the identification result may change depending on the context, etc., but an identification problem is treated as an optimization problem that maximizes the evaluation function. Depending on the type of high rank symbol or the purpose of motion recognition, etc., not only the sequence of high rank symbols with the maximum score 606 but also a plurality of sequences of high rank symbols with high scores may be outputted.

[E] Recognition of Techniques in Gymnastics

As described above, the motion recognition system 100 and method according to the present embodiment can be applied to recognition or identification of techniques from whole body motion data during performance in gymnastics. A performance consists of techniques each of which is a series of basic motions. The present embodiment is characterized in that identifying the basic motion from the whole-body motion data during the performance and finding a series of basic motions suitable for a technique are reduced to a dynamic programming problem.

Specifically, the technique recognition process in gymnastics comprising: segmenting the performer's motion data (time-series data of the performer's pose) into segments (cut out so that each segment is recognized as a basic motion); converting the motion data to a series of basic motions by classifying the segment that is the segmented motion into a basic motion class, specifically, for example, by classifying each segment into the basic motion class using an HMM; and automatically recognizing a technique by extracting a series of basic motions suitable as a technique using dynamic programming.

Figure 4:
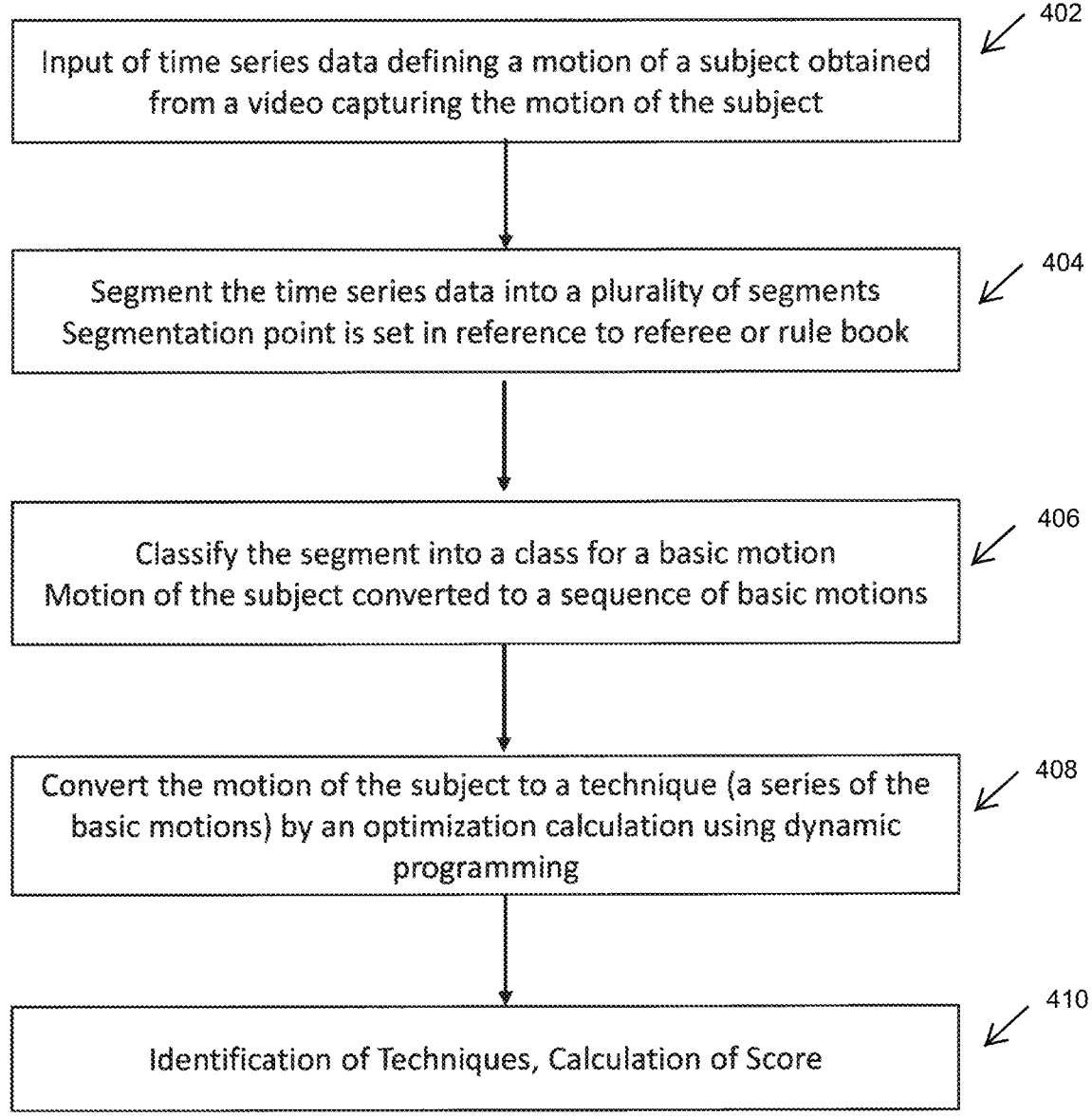
FIG. 4 is a flowchart showing a process of identifying a technique in a motion.
Figure 5:
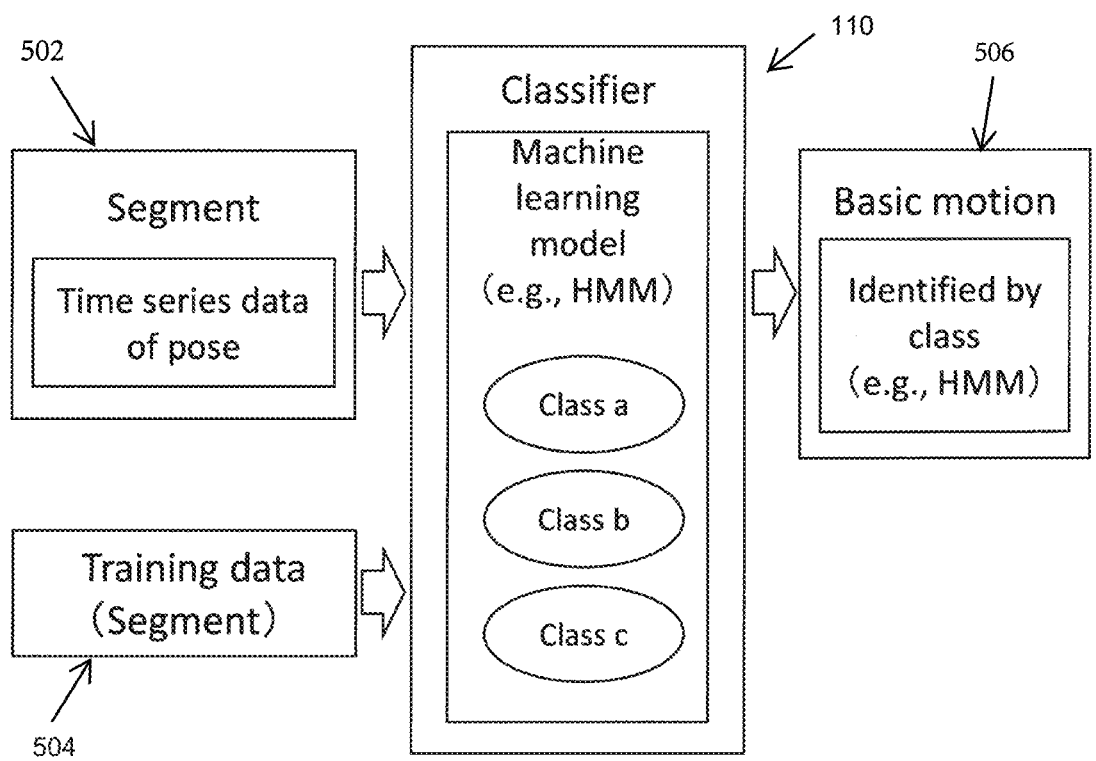
FIG. 5 is a diagram showing the configuration of a classifier that classifies a segment into a class of a basic motion.
Figure 6:
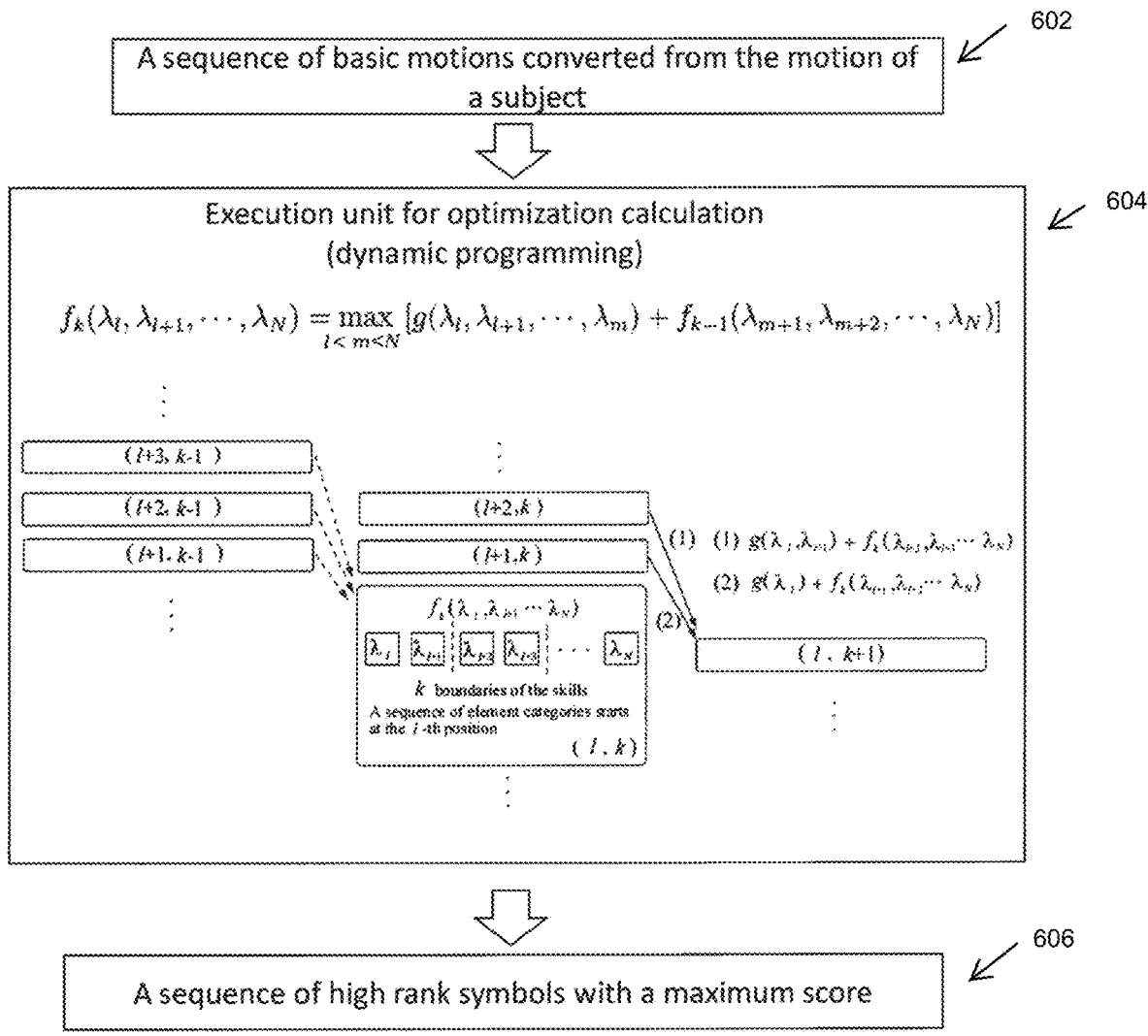
FIG. 6 is a diagram showing a process of converting a sequence of basic motions corresponding to a motion of a subject into a sequence of high rank symbols.
Figure 8:
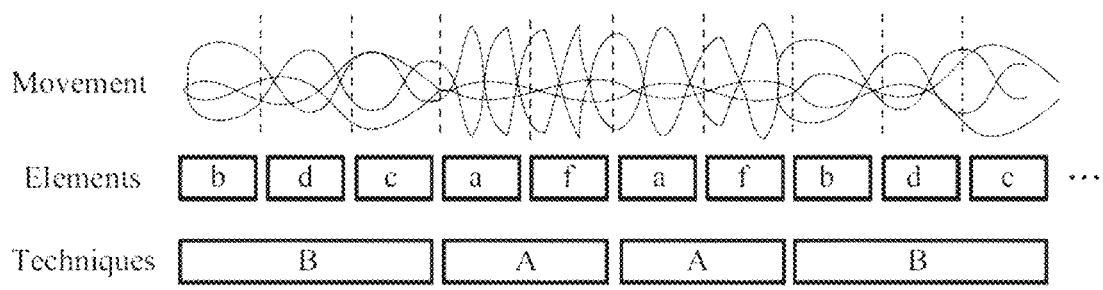
FIG. 8 is a conceptual diagram showing motion recognition according to the present embodiment.

Referring to FIGS. 4 and 8, the motion data of the subject is obtained from the video of the performance of the subject 402. The motion data is segmented into a plurality of segments 404 using the segmentation points which are set with reference to the referee or the rulebook, and the motion data is represented as a time series of the segments.

Each segment is recognized as one of the basic motions (a, b, c, d, . . . refers to a basic motion or a label of HMM) by an HMM, for example and is classified into the basic motion class 406. The motion of the subject is converted into a time series of basic motions 408 (a sequence of HMMs "bdcafafbdc" corresponding to the classes) by recognizing each segment as one of the basic motions.

A technique is identified from the basic motion sequence 410, and the motion of the subject is converted into a sequence of techniques (BAAB . . . ). In the case of gymnastics, the "technique" is defined as a series of basic motions in order. Generally, there is not only one combination that can be identified as a series of basic motions as a technique. In gymnastics, the techniques are identified so that the scoring result for the athlete is maximized, and the identifications of techniques are scored to obtain the result. The score is obtained by the dynamic programming by expressing a method of identifying the motion so as to maximize the scoring result as an optimization problem and expressing the process of generating the basic motions as a dynamic system.

The storage unit 104 of the motion recognition system 100 stores a table that defines the correspondence between the basic motion sequence and the technique and score. In the above recursive relation, the function $g(\lambda_l, \lambda_{l+1}, \ldots, \lambda_m)$ is an evaluation function that determines the evaluation value, or the score. A simple example of score calculation using the evaluation function will be described.

In an example of Table 1, an ID and a label are assigned to each technique, and a plurality of basic motion sequences abc, abd, and abe are assigned corresponding to the technique label A. Scores of all the basic motion sequences abc, abd, and abe are 1. When any of the basic motion sequences abc, abd, and abe is recognized in the sequence of basic motions converted from the motion data, the evaluation function outputs a score of 1.

TABLE 1

| ID | Technique label | Sequence of basic motions | Score |
|---|---|---|---|
| 1 | A | abc | 1 |
|   |   | abd | 1 |
|   |   | abe | 1 |

In an example of Table 2, an ID and a label are assignd to each technique, and a plurality of basic operation sequences abc, abd, and abe are assigned corresponding to the technique label A. Scores of the basic motion sequences abc, abd, and abe are 1, 0.9, and 0.8, respectively. When each of the basic motion sequence abc, abd, and abe is recognized in the sequence of basic motions converted from the motion data, the evaluation function outputs a score of 1, 0.9, and 0.8, respectively. A method for setting a score is not limited, and for example, a score may be set empirically from a large amount of performance motion data samples, or a likelihood calculated in some form may be used as a score.

TABLE 2

| ID | Technique label | Sequence of basic motions | Score |
|---|---|---|---|
| 1 | A | abc | 1 |
|   |   | abd | 0.9 |
|   |   | abe | 0.8 |

In an example of Table 3, an ID and a label are assigned to each technique, and a plurality of basic motion sequences abc, abd, and abe are assigned corresponding to the technique label A. Scores of all the basic motion sequences abc, abd, and abe are 1, and if any of the basic motion sequences abc, abd, and abe is recognized in the sequence of basic motions converted from the motion data, the evaluation function outputs a score 1. A plurality of basic motion sequences ghij and ghik are assigned corresponding to the technique label B. Scores of all the basic motion sequences are 3, and when any of the basic motion sequences ghij and ghik is recognized in the sequence of basic motions converted from the motion data, the evaluation function outputs a score of 3. The difference between the score of the technique label A and the score of the technique label B reflects a difficulty level of the technique. Further, the evaluation function is equivalent to setting a score of 1 for all the basic motion sequences corresponding to the technique label A and the technique label B, and separately setting an addition point depending on the difficulty level for the technique label B.

TABLE 3

| ID | Technique label | Sequence of basic motions | Score |
|---|---|---|---|
| 1 | A | abc | 1 |
|   |   | abd | 1 |
|   |   | abe | 1 |

TABLE 3-continued

| ID | Technique label | Sequence of basic motions | Score |
|---|---|---|---|
| 2 | B | ghij | 3 |
|   |   | ghik | 3 |

In the above description, the technique label has been briefly described, but as shown in Table 4, the technique labels are actually manually assigned to the consecutive basic motions. A sequence of basic motions (a sequence of HMMs) is stored as a database with respect to a technique ID and a technique label though omitted in Table 4.

TABLE 4

| Maneuver index | Maneuver description |
|---|---|
| 1 | For transition |
| 2 | Scissor backward |
| 3 | Any circle or flair in side support |
| 4 | Circles with travel fwd. in side support |
| 5 | Circles in cross support frontways on end |
| 6 | On the end, Russian wend. with 720° or 900° |
| 7 | Travel bwd. In cross sup. From one horse part or pommel to another (⅓) |
| 8 | Reverse stöckli or direct stöckli A through hdst. |
| 9 | Scissor forward |
| 10 | Russian wendeswing with 180° or 270° |
| 11 | Circles in cross support on one pommel (from or to ¼ t. fwd.) |
| 12 | Direct stöckli B |
| 13 | From side sup. on end, circle or flair to hdst. and travel ⅔ with 450° or more turn |

In the present embodiment, a function for calculating a score from a set of a technique and a basic motion sequence is provided, and an optimization calculation using dynamic programming is executed using the score calculated by this function. In one embodiment, the function calculates a score using a table in which one or more basic motion sequences and scores correspond to a technique. In one aspect, a function that calculates the score for the combination of the technique and the basic motion sequence as a probability value (likelihood) has been learned, and the score for the combination of the technique and the basic motion sequence is calculated using the parameters of the above function.

In summary, the technique recognition system in the gymnastics according to the present embodiment relates to a system for recognizing techniques in athletics by sequentially processing the steps of:
(1) segmentation to find segments in the whole body motion;
(2) calculation to identify an extracted segment by comparing with a basic motion; and
(3) calculation to identify a technique from a sequence of consecutive basic motions. The technique recognition system provides the basis for calculation theory regarding segmentation of gymnastics performance, identification of basic motions, and recognition of techniques from the time series of the basic motions.

The score of the performance in the gymnastics competition is calculated by the sum of the D score and the E score. The D score represents the difficulty of the performance content, that is, a difficulty level of the performance, and the E score represents the degree of completion of the performance. In the present embodiment, the D score can be applied to an automatic scoring system of gymnastics by matching the function that calculates the score based on the set of the technique and the basic motion sequence with an actual scoring method for the D score (for example, by matching the scores stored in the table with the actual scoring method for the D score with reference to the rulebook that compiles the scoring rules). Therefore, the motion recognition system and method according to the present embodiment can be used for an automatic scoring system for the performance, an exercise instruction, and a training program for feeding back an objective evaluation.

The invention claimed is:

1. A motion recognition method comprising:
segmenting time series data defining a motion of a subject into a plurality of segments,
classifying each segment into a class for a basic motion by using time series data of said segment,
converting the motion of the subject to a sequence of high rank symbols in which each high rank symbol is formed from a series of the basic motions, and
calculating a score based on a set of a high rank symbol and a sequence of basic motions by a function;
wherein said motion of the subject is converted to the sequence of the high rank symbols by an optimization calculation using dynamic programming; and
wherein said optimization calculation using the dynamic programming comprising using the following recursive relation:

$$f_k(\lambda_l, \lambda_{l+1}, \ldots, \lambda_N) =$$
$$\max_{l \leq m < N}[g(\lambda_l, \lambda_{l+1}, \ldots, \lambda_m) + f_{k-1}(\lambda_{m+1}, \lambda_{m+2}, \ldots, \lambda_N)]$$

where:
$f_k(\lambda_l, \lambda_{l+1}, \ldots, \lambda_N)$ refers to a maximum score obtained when a sequence of k pieces of the high rank symbols is recognized from a series of the basic motions $\lambda_l, \lambda_{l+1}, \ldots, \lambda_N$;
$g(\lambda_l, \lambda_{l+1}, \ldots, \lambda_m)$ refers to a score obtained when a sequence of basic motions $\lambda_l, \lambda_{l+1}, \ldots, \lambda_m$ is identified as a high rank symbol; and
N refers to the number of segments obtained by segmenting the motion of the subject.

2. The motion recognition method according to claim 1, wherein one or more sequences of the basic motions and scores corresponding to a high rank symbol are stored in a table.

3. The motion recognition method according to claim 1 wherein the segment is classified into the class for the basic motion using a Hidden Markov Model (HMM).

4. The motion recognition method according to claim 1 wherein said high rank symbol comprises a technique in athletics.

5. The motion recognition method according to claim 4, wherein the score reflects a difficulty of the technique.

6. The motion recognition method according to claim 1, said method further comprising converting the motion of the subject to a sequence of higher rank symbols which represents a superordinate motion by using an obtained high rank symbol as a segment.

7. A motion recognition system comprising a memory and a processor,
said memory configured to store classes for a plurality of basic motions; and
said processor is configured to:
segment time series data defining a motion of a subject into a plurality of segments, classify each segment into a class for a basic motion by using time series data of said segment, and
convert the motion of the subject to a sequence of high rank symbols in which each high rank symbol is formed from a series of the basic motions, and
calculate a score based on a set of a high rank symbol and a sequence of basic motions by a function stored in said memory,
wherein the motion of the subject is converted to the sequence of the high rank symbols by an optimization calculation using dynamic programming and the score;
wherein said processor is configured to perform the optimization calculation by dynamic programming using the following recursive relation:

$$f_k(\lambda_l, \lambda_{l+1}, \ldots, \lambda_N) =$$
$$\max_{l \leq m < N}[g(\lambda_l, \lambda_{l+1}, \ldots, \lambda_m) + f_{k-1}(\lambda_{m+1}, \lambda_{m+2}, \ldots, \lambda_N)]$$

where:
$f_k(\lambda_l, \lambda_{l+1}, \ldots, \lambda_N)$ refers to a maximum score obtained when a sequence of k pieces of the high rank symbols is recognized from a series of the basic motions $\lambda_l, \lambda_{l+1}, \ldots, \lambda_N$;
$g(\lambda_l, \lambda_{l+1}, \ldots, \lambda_m)$ refers to a score obtained when a sequence of basic motions $\lambda_l, \lambda_{l+1}, \ldots, \lambda_m$ is identified as a high rank symbol; and
N refers to the number of segments obtained by segmenting the motion of the subject.

8. The motion recognition system according to claim 7, wherein one or more sequences of the basic motions and scores corresponding to a high rank symbol are stored in a table.

9. The motion recognition system according to claim 7 wherein said processor is configured to classify the segment into the class for the basic motion using a Hidden Markov Model (HMM).

10. The motion recognition system according to claim 7 wherein said high rank symbol comprises a technique in athletics.

11. The motion recognition system according to claim 10, wherein the score reflects a difficulty of the technique.

12. The motion recognition system according to claim 7, said processor is configured to convert the motion of the subject to a sequence of higher rank symbols which represents a superordinate motion by using an obtained high rank symbol as a segment.

13. A non-transitory computer-readable storage medium which stores a program that causes a computer to execute a process, said process comprising:
segmenting time series data defining a motion of a subject into a plurality of segments,
classifying each segment into a class for a basic motion by using time series data of said segment, and
converting the motion of the subject to a sequence of high rank symbols in which each high rank symbol is formed from a series of the basic motions,
calculating a score based on a set of a high rank symbol and a sequence of basic motions by a function, and
wherein said motion of the subject is converted to the sequence of the high rank symbols by an optimization calculation using dynamic programming;

wherein said optimization calculation using the dynamic programming comprising using the following recursive relation:

$$f_k(\lambda_l, \lambda_{l+1}, \ldots, \lambda_N) = \max_{l \leq m < N}[g(\lambda_l, \lambda_{l+1}, \ldots, \lambda_m) + f_{k-1}(\lambda_{m+1}, \lambda_{m+2}, \ldots, \lambda_N)]$$

where:
$f_k(\lambda_l, \lambda_{l+1}, \ldots, \lambda_N)$ refers to a maximum score obtained when a sequence of k pieces of the high rank symbols is recognized from a series of the basic motions $\lambda_l, \lambda_{l+1}, \ldots, \lambda_N$;
$g(\lambda_l, \lambda_{l+1}, \ldots, \lambda_m)$ refers to a score obtained when a sequence of basic motions $\lambda_l, \lambda_{l+1}, \ldots, \lambda_m$ is identified as a high rank symbol; and
N refers to the number of segments obtained by segmenting the motion of the subject.

* * * * *